US012762275B2

(12) United States Patent
Yang

(10) Patent No.: US 12,762,275 B2
(45) Date of Patent: Oct. 13, 2026

(54) MANAGING OWNERSHIPS OF FINE-GRAINED PRIVACY-PRESERVING COLUMNS

(71) Applicant: Beijing Volcano Engine Technology Co., Ltd., Beijing (CN)

(72) Inventor: Xinying Yang, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 48 days.

(21) Appl. No.: 18/805,498

(22) Filed: Aug. 14, 2024

(65) Prior Publication Data

US 2026/0050687 A1 Feb. 19, 2026

(51) Int. Cl.
*G06F 21/00* (2013.01)
*G06F 21/62* (2013.01)

(52) U.S. Cl.
CPC ................................ *G06F 21/6245* (2013.01)

(58) Field of Classification Search
CPC .................................................. G06F 21/6245
See application file for complete search history.

(56) References Cited

U.S. PATENT DOCUMENTS 6,115,704 A * 9/2000 Olson .................. G06F 16/284
2007/0226218 A1* 9/2007 Chatterjee ........... G06F 16/2343
2012/0016761 A1* 1/2012 Najm ..................... G06Q 30/06 705/26.1
2017/0323276 A1* 11/2017 Sobolevski ............ G06Q 20/10
2026/0099621 A1* 4/2026 Yang .................. G06F 16/2379

OTHER PUBLICATIONS

Androulaki et al.; "Hyperledger fabric: a distributed operating system for permissioned blockchains"; Proceedings of the 13$^{th}$ EuroSys Conf.; 2018; 15 pages.
Antonopoulos et al.; "Azure SQL Database Always Encrypted"; SIGMOD; Jun. 2020; p. 1511-1525.
Antonopoulos et al.; "SQL Ledger: Cryptographically Verifiable Data in Azure SQL Database"; Proceedings of the Int'l Conf. on Management of Data; 2021; pl 2437-2449 (Abstract Only).
(Continued)

*Primary Examiner* — Jeffrey C Pwu
*Assistant Examiner* — Helai Salehi
(74) *Attorney, Agent, or Firm* — BakerHostetler

(57) ABSTRACT

The present disclosure describes techniques for managing ownerships of fine-grained privacy-preserving columns. A catalog table configured to record ownership information of the fine-grained privacy-preserving columns is created. A fine-grained privacy-preserving column is created in response to receiving a first instruction from a first user. The first user is an owner of the fine-grained privacy-preserving column. An ownership of the fine-grained privacy-preserving column is transferred from the first user to a second user in response to receiving a second instruction from the first user. The catalog table is updated by inserting a first row into the catalog table in response to detecting a transfer of the ownership of the fine-grained privacy-preserving column to the second user. The first row of the catalog table records information indicating that the first user is a previous owner of the fine-grained privacy-preserving column.

17 Claims, 14 Drawing Sheets

(56) References Cited

OTHER PUBLICATIONS

Arasu et al.; "Orthogonal Security With Cipherbase"; CIDR; Jan. 2013; 10 pages.
Arasu et al.; "Concerto: A High Concurrency Key-Value Store with Integrity"; SIGMOD; May 2017; p. 251-266.
ARM; TrustZone Technology; 2004 (book).
Aumasson et al.; "SHA-3 proposal BLAKE"; NIST 92; Oct. 2008; 79 pages.
Amazon Quantum Ledger Database; https://aws.amazon.com/gldb/; Amazon Web Services Inc.; © 2025; accessed Jun. 6, 2025; 4 pages.
Bajaj et al.; "TrustedDB: a trusted hardware based database with privacy and data confidentiality"; SIGMOD; Jun. 2011; p. 205-216.
Bajaj et al.; "TrustedDB: a trusted hardware based database with privacy and data confidentiality"; IEEE Transactions on Knowledge and Data Engineering; vol. 26; 2013; p. 752-765 (Abstract Only).
Boldyreva et al.; "Order-Preserving Encryption Revisited: Improved Security Analysis and Alternative Solutions"; Advances in Cryptology; 2011; 43 pages.
Volcanic Engine—A new driving force for cloud growth; https://www.volcengine.com/; Beijing Volcano Engine Technology Co. Ltd.; © 2025; accessed Jun. 10, 2025; 5 pages.
Make Your Day—Real People. Real Videos; https://www.tiktok.com/Lo; TikTok; accessed Jun. 10, 2025; 4 pages.
Volcengine; https://github.com/volcengine; GitHub; accessed Jun. 10, 2025; 4 pages.
Chen et al.; "Intel TDX Demystified: A Top-Down Approach"; Cryptography and Security; arXiv:2303.15540; Mar. 2023; 33 pages.
Cheon et al; "Homomorphic Encryption for Arithmetic of Approximate Numbers"; Advances in Cryptology; 2017; 23 pages.
End-to-end data encryption; https://www.alibabacloud.com/help/en/polardb-for-oracle/latest/end-to-end-data-encryption; Alibaba Cloud; © 2009-2025; accessed Jun. 17, 2025; 2 pages.
Intel®Software Guard Extensions SDK for Linux OS; https://www.intel.com/content/www/us/en/developer/tools/software-guard-extensions/linux-overview.html; accessed Jun. 10, 2025; 5 pages.
Intel®Trust Domain Extensions (Intel®TDX); https://www.intel.com/content/www/us/en/developer/tools/trust-domain-extensions/over html; accessed Jun. 10, 2025; 7 pages.
Cc-api / full-disk-encryption; https://github.com/cc-api/full-disk-encryption; GitHub; accessed Jun. 10, 2025; 5 pages.
Daemen et al.; "AES proposal: Rijndael"; The Rijndael Bock Cipher; 1999; 93 pages.
Date et al.; "Time and Relational Theory—Temporal Dabases in the Relational Model and SQL"; Morgan Kaufmann; © 2014 (book).
Ekberg et al.; "Trusted execution environments on mobile devices"; ACM SIGSAC; Nov. 2013; 3 pages.
El-Hindi et al.; "BlockchainDB: a shared database on blockchains"; VLDB Endowment; vol. 12 No. 11; 2013; p. 1597-1609.
El-Hindi et al.; "Benchmarking the Second Generation of Intel SGX Hardware"; $18^{th}$ Int'l Workshop on Data Management on New Hardware; Jun. 2022; 8 pages.
Intel®TDX Connect Architecture Specification; https://www.intel.com/content/www/us/en/content-details/773614/intel-tdx-connect-architecture-specification.html; Mar. 2023; accessed Jun. 11, 2025; 40 pages.
C. Gentry; "Fully homomorphic encryption using ideal lattices"; $41^{st}$ Annual ACM Symposium on Theory of Computing; 2009; p. 169-178.
Hacigumus et al.; "Executing SQL over encrypted data in the database-service-provider model"; ACM SIGMOD Int'l Conf. on Management of Data; Jun. 2002; p. 216-227.
Hearn et al.; "Corda: A distributed ledger"; White Paper Version 1; Aug. 2019; 73 pages.
Codepage option syntax; https://www.ibm.com/docs/en/cobol-zos/6.3.0?topic=options-codepage; IBM; Nov. 2024; accessed Jun. 23, 2025; 4 pages.
Column-level privileges; https://www.ibm.com/docs/en/informix-servers/14.10.0?topic=privileges-column-level; IBM; Mar. 2023; accessed Jun. 23, 2025; 3 pages.
https://www.letsign.com/; Bytedance; © 2014-2025; accessed Jun. 11, 2025; 10 pages.
Jauernig et al.; "Trusted Execution Environments: Properties, Applications, and Challenges"; IEEE Security & Privacy; vol. 18; 2020; p. 56-60 (Abstract Only).
Kaplan et al.; "AMD Memory Encryption"; White Paper; Oct. 2021; 12 pages.
Knauth et al.; "Integrating Intel SGX Remote Attestation with Transport Layer Security"; Cryptography and Security; arXiv:1801.05863; 2018; 14 pages.
K. Kollenda et al.; "General overview of AMD SEV-SNP and Intel TDX"; 2023; 8 pages.
Lee et al.; "Keystone: an open framework for architecting trusted execution environments"; $15^{th}$ European Conf. on Computer Systems; No. 38; 2020; 16 pages.
Li et al.; "Design and Verification of the Arm Confidential Compute Architecture"; $16^{th}$ USENIX Symposium on OSDI; Jul. 2022; p. 465-484.
McConaghy et al.; "BigchainDB: A Scalable Blockchain Database"; White Paper; Jun. 2016; 66 pages.
McKeen et al.; "Intel® Software Guard Extensions (Intel® SGX) Support for Dynamic Memory Management Inside an Enclave"; Proceedings of HASP; No. 10; Jun. 2016; 9 pages.
Temporal tables; https://learn.microsoft.com/en-us/sql/relational-databases/tables/temporal-tables?view=sql-server-ver17; Microsoft; May 2025; accessed Jun. 12, 2025; 7 pages.
Grant (Transact-SQL); https://learn.microsoft.com/en-us/sql/t-sql/statements/grant-transact-sql?view=sql-server-ver17; Microsoft; Dec. 2014; accessed Jun. 12, 2025; 7 pages.
MongoDB Data Encryption; https://www.mongodb.com/products/capabilities/security/encryption; MongoDB Inc.; © 2025; accessed Jun. 12, 2025; 10 pages.
My SQL 8.4 Reference Manual; https://dev.mysql.com/doc/refman/8.4/en/sql-prepared-statements.html#prepared-statements-in-applications; Oracle; © 2025; accessed Jun. 12, 2025; 6 pages.
"Everything you need to know about the "Right to be forgotten""; https://gdpr.eu/right-to-be-forgotten; Proton AG; © 2025; accessed Jun. 12, 2025; 5 pages.
Ogburn et al.; "Homomorphic Encryption"; Procedia Computer Science; vol. 20; 2013; p. 502-509.
Blockchain Tables in Oracle Database 21c; https://oracle-base.com/articles/21c/blockchain-tables-21c; Oracle; accessed Jun. 12, 2025; 10 pages.
My SQL 14.13 Reference Manual; https://dev.mysql.com/doc/refman/8.0/en/encryption-functions.html; Oracle; © 2025; accessed Jun. 12, 2025; 12 pages.
Implementing Temporal Validity; https://www.oracle.com/webfolder/technetwork/tutorials/obe/db/12c/r1/ilm/temporal/temporal.html; Oracle;; © 2025; accessed Jun. 12, 2025; one page.
Grant Statement; https://dev.mysql.com/doc/refman/8.4/en/grant.html; Oracle; © 2025; accessed Jun. 23, 2025; 20 pages.
Pardau et al.; "The California Consumer Privacy Act: Towards a European-Style Privacy Regime in the United States?"; Journal of Technology Law & Policy; vol. 23 Issue 1; Jun. 2018; 48 pages.
Poddar et al.; "Arx: An Encrypted Database using Semantically Secure Encryption"; Cryptology ePrint Archive; 2016; 2 pages (Abstract Only).
Poddar et al.; "Arx: An Encrypted Database using Semantically Secure Encryption"; Proceedings of the VLDB Endowment; vol. 12 No. 11; 2019; 23 pages.
Always Encrypted with secure enclaves; https://learn.microsoft.com/en-us/sql/relational-databases/security/encryption/always-encrypted-enclaves?view=sql-server-ver17; Microsoft; Mar. 2025; accessed Jun. 12, 2025; 11 pages.
Priebe et al.; "EnclaveDB: A Secure Database Using SGX"; IEEE Symposium on Security and Privacy; 2018; p. 264-278.
Sahita et al.; "Security analysis of confidential-compute instruction set architecture for virtualized workloads"; Int'l Symposium on Secure and Private Execution Environment Design; 2021; p. 121-131 (Abstract Only).
Sardar et al.; "Demystifying Attestation in Intel Trust Domain Extensions via Formal Verification"; IEEE Access; vol. 9; 2021; p. 83067-83079.

(56) References Cited

OTHER PUBLICATIONS

Sebastian et al.; "Performance Considerations of Intel® Trust Domain Extensions on 4th Generation Intel® Xeon® Scalable Processors"; https://www.intel.com/content/www/us/en/developer/articles/technical/trust-domain-extensions-on-4th-gen-xeon-processors.html; Sep. 2023; accessed Jun. 12, 2025; 12 pages.
S. Ilyas; "Column-level security with Oracle Database's data redaction"; https://blogs.oracle.com/cloudsecurity/post/columnlevel-security-oracle-databases-data-redaction; Oracle; Oct. 2023; accessed Jun. 12, 2025; 10 pages.
Senthil et al.; "Blockchain Meets Database: Design and Implementation of a Blockchain Relational Database"; Proceedings of the VLDB Endowment; 2019; p. 1539-1552.
Encryption Amazon Aurora resources; https://docs.aws.amazon.com/AmazonRDS/latest/AuroraUserGuide/Overview.Encryption.html; Amazon Web Services Inc.; © 2025; accessed Jun. 12, 2025; 13 pages.
AMD SEV-SNP: Strengthening VM Isolation with Integrity Protection and More; White Paper; Jan. 2020; 20 pages.
Shen et al.; "Occlum: Secure and Efficient Multitasking Inside a Single Enclave of Intel SGX"; Operating Systems; arXiv:2001.07450; Jan. 2020; 16 pages.
Sinha et al.; "VeritasDB: High Throughput Key-Value Store with Integrity"; IACR; No. 251; 2018; 3 pages.
Akopytov / sysbench; https://github.com/akopytov/sysbench; GitHub; accessed Jun. 17, 2025; 7 pages.
TPC®; https://www.tpc.org/tpcc/; TPC; © 1988-2025; accessed Jun. 17, 2025; 3 pages.
Tsai et al.; "Graphene-SGX: A Practical Library OS for Unmodified Applications on SGX"; USENIX Annual Technical Conf.; 2017; p. 645-658.
Tu et al.; "Processing analytical queries over encrypted data"; Proceedings of the VLDB Endowment; vol. 6; 2013; p. 289-300.
Vinayagamurthy et al.; "StealthDB: a Scalable Encrypted Database with Full SQL Query Support"; Proceedings on Privacy Enhancing Technologies Symposium; vol. 3; 2019; p. 370-388.
Voight et al.; "The EU General Data Protection Regulation (GDPR)"; 1st Edition; Springer Int'l Publishing; 2017; (book).
VeDB for MySQL; https://www.volcengine.com/product/vedb-mysql; Beijing Volcano Engine Technology Co. Ltd.; © 2025; accessed Jun. 23, 2025; 10 pages.
Volos et al.; "Graviton: Trusted Execution Environments on GPUs"; 13th USENIX Symposium on Operating Systems Design and Implementation; Oct. 2018; p. 681-696.
Yang et al.; VeDB: A Software and Hardware Enabled Trusted Relational Database; Proceedings of the ACM on Management of Data; vol. 1 No. 194; Jun. 2023; 27 pages.
Yang et al.; "LedgerDB: a centralized ledger database for universal audit and verification"; Proceedings of the VLDB Endowment; vol. 13; 2020; p. 3138-3151.
Yue et al.; "GlassDB: An Efficient Verifiable Ledger Database System Through Transparency"; Proceedings of the VLDB Endowment; vol. 16; 2023; p. 1359-1371.
Yue et al.; "VeriBench: Analyzing the Performance of Database Systems with Verifiability"; Proceedings of the VLDB Endowment; vol. 16; 2023; p. 2145-2157.
Zhang et al.; "SHELTER: Extending Arm CCA with Isolation in User Space"; 32nd USENIX Security Symposium; Aug. 2023; p. 6257-6274.

* cited by examiner

MANAGING OWNERSHIPS OF FINE-GRAINED PRIVACY-PRESERVING COLUMNS

BACKGROUND

Certain data may be sensitive or confidential. Permission to such data may be restricted to a particular set of parties. For example, sensitive or confidential data may be encrypted so that only authorized parties can access it. As the quantity of sensitive or confidential data continues to increase, people continue to desire new ways for managing access to and ownership of data.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

An in-enclave (e.g., fully hardware encrypted) relational database that supports privacy-preserving and verifiable functionalities can be implemented by residing an entire database management system (DBMS) in a hardware-based security engine that isolates and protects data in use against attack within a virtual machine (VM). In this fully hardware encrypted database architecture, all memory, central processing unit(s), and input/output (I/O) security can be protected from data leaks. Thus, any DBMS internally used data structures and data stores that do not have explicit retrieval interfaces cannot be viewed by adversaries, such as system and physical logs.

When creating or altering a table in this hardware encrypted database architecture, a privacy-preserving column can be defined with an additional keyword "SECRET." The owner of the secret column can see the plaintext. Other users cannot observe the plaintext in any way, such as for data retrieval, predicate handling, log probing, or statistic viewing. The owner can execute data control language (DCL) operations to grant column visibility to another user (e.g., using the command "GRANT VIEWER DCL") and to remove or revoke visibility control from a user (e.g., using a "DENY" or "REVOKE" command). These DCL operations can be only executed by the secret column owner to prevent unexpected operations from high-privileged roles such as database administrators (DBAs).

An owner of a privacy-preserving column can transfer the ownership of the privacy-preserving column to another user. If the owner transfers the ownership of the privacy-preserving column to another user, the original owner can be automatically downgraded to a viewer of the privacy-preserving column, as there can only be one user that holds the owner role for a privacy-preserving column at one time.

Figure 1:
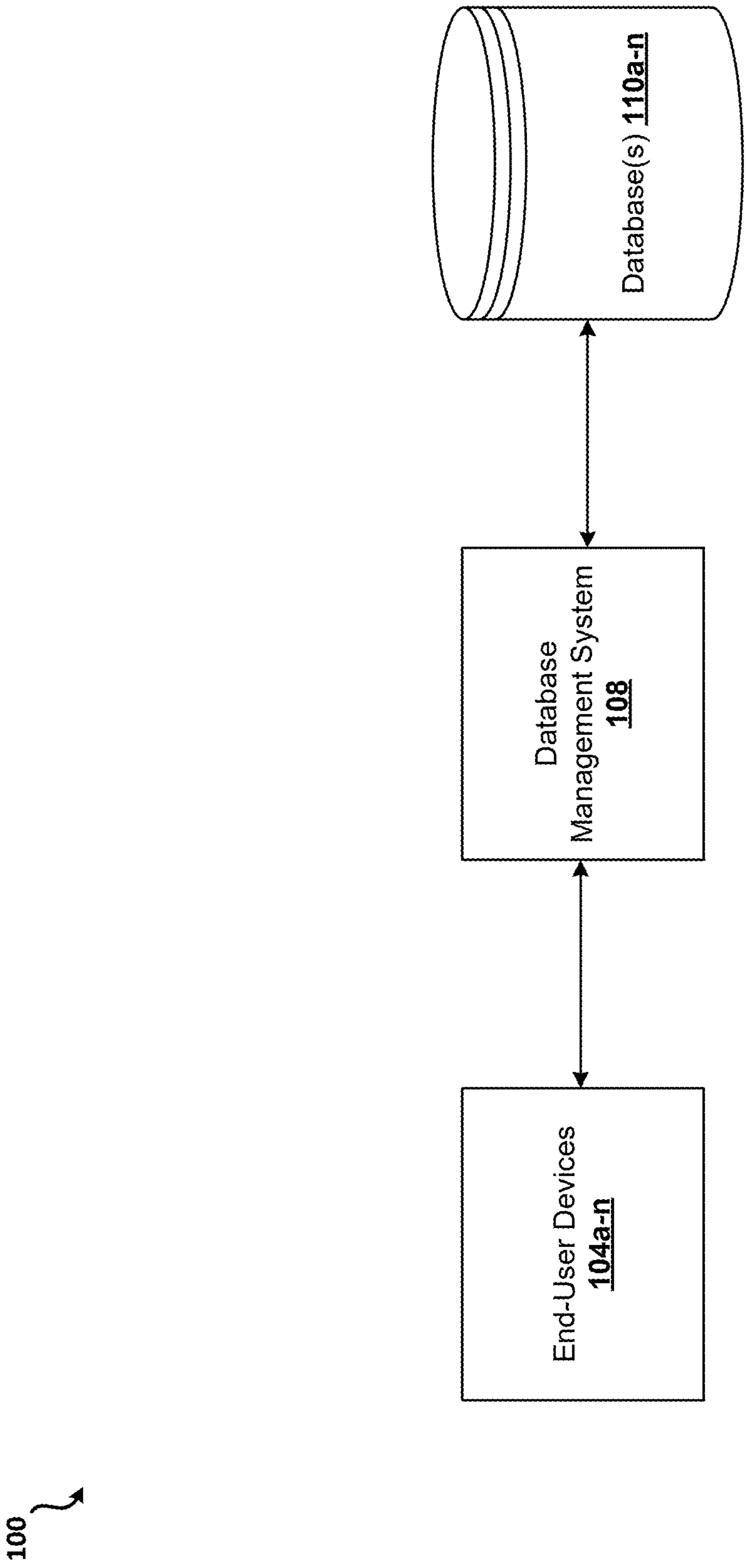
FIG. 1 shows an example system for managing ownership of fine-grained privacy-preserving columns in accordance with the present disclosure.

Described here are improved techniques for managing ownership of fine-grained privacy-preserving columns. The techniques described herein enable the reversion of ownership transfer operations, such as if the ownership of a fine-grained privacy-preserving column is accidentally transferred to a wrong user. FIG. 1 shows an example system 100 for managing ownership of fine-grained privacy-preserving columns in accordance with the present disclosure. The system 100 includes a plurality of end user devices 104*a-n*, a DBMS 108, and at least one database 110.

The at least one database 110 can store data, such as in the form of one or more tables. Each of the table(s) can include one or more fine-grained privacy-preserving columns. Each fine-grained privacy-preserving column can include secret information. Each fine-grained privacy-preserving column can be defined with the additional keyword "SECRET." Only an owner of a particular fine-grained privacy-preserving column can be allowed to execute DCL operations associated with that fine-grained privacy-preserving column. The owner of the particular fine-grained privacy-preserving column can be associated with one or more of the plurality of end user devices 104*a-n*. Only the one or more end user devices associated with the owner can be used to execute DCL operations associated with that fine-grained privacy-preserving column.

The DBMS 108 can create a catalog table. The catalog table can be configured to record ownership information of the fine-grained privacy-preserving columns.

For example, the catalog table can be configured to record previous owners of each the fine-grained privacy-preserving columns. The catalog table can be used (e.g., by the DBMS 108) to revert ownership transfer operations, such as if the ownership of a fine-grained privacy-preserving column is accidentally transferred to a wrong user.

The catalog table can include a first column and a second column. The first column can be configured to record identification information of the fine-grained privacy-preserving columns. The second column can be configured to record information indicative of previous owners of the fine-grained privacy-preserving columns. The DBMS 108 can automatically update the catalog table to record historical ownership transfers associated with the fine-grained privacy-preserving columns.

A fine-grained privacy-preserving column can be created in response to receiving a first instruction from a first user. The first user can be associated with a first end user device 104*a* among the plurality of end user devices 104*a-n*. The first instruction can be received from the first end user device 104*a*. The first user can be an owner of the fine-grained privacy-preserving column. The first user is the owner of the fine-grained privacy-preserving column and is the only user that has permission to execute DCL operations associated with the fine-grained privacy-preserving column.

The first user is able to transfer ownership of the fine-grained privacy-preserving column to a second (e.g., different) user. The second user can be associated with a second end user device 104*b* among the plurality of end user devices 104*a-n*. An ownership of the fine-grained privacy-preserving column can be transferred from the first user to the second user in response to receiving a second instruction from the first user (e.g., from the first end user device 104*a*). If the ownership of the fine-grained privacy-preserving column is transferred from the first user to the second user, the second user is the only user that has permission to execute DCL operations associated with the fine-grained privacy-preserving column. The first user can be automatically downgraded to a viewer of the fine-grained privacy-preserving column in response to detecting the transfer of the ownership of the fine-grained privacy-preserving column from the first user to the second user. For example, the first user is no longer able to execute DCL operations associated with the fine-grained privacy-preserving column, but the first user may still be able to view the secret information stored in the fine-grained privacy-preserving column.

The DBMS 108 can update the catalog table. The DBMS 108 can update the catalog table in response to detecting a transfer of the ownership of the fine-grained privacy-preserving column from the first user to the second user. The DBMS 108 can update the catalog table by inserting a first row into the catalog table. The first row of the catalog table can record information indicating that the first user is the previous owner of the fine-grained privacy-preserving column. The first row may only indicate the previous owner of the fine-grained privacy-preserving column (e.g., the first user), but not the current owner (e.g., the second user) of the fine-grained privacy-preserving column. Identification information of the fine-grained privacy-preserving column can be stored in the first column of the first row. Identification information of the first user can be stored in the second column of the first row.

In embodiments, ownership of the fine-grained privacy-preserving can be revoked from the second user. For example, the first user may have transferred ownership of the fine-grained privacy-preserving column accidentally (e.g., by mistake). If ownership of the fine-grained privacy-preserving is to be revoked from the second user, a highly privileged user (e.g., a database administrator) can send a command to revoke the ownership of the fine-grained privacy-preserving column from the second user in accordance with the first user's instruction. The command to revoke the ownership of the fine-grained privacy-preserving column from the second user can be received by the DBMS 108.

If the DBMS 108 receives a command to revoke the ownership of the fine-grained privacy-preserving column from the second user, the DBMS 108 can determine a previous owner of the fine-grained privacy-preserving column. The DBMS 108 can determine a previous owner of the fine-grained privacy-preserving column using the catalog table, such as by using the information recorded in the first row of the catalog table. For example, determining the previous owner of the fine-grained privacy-preserving column using the catalog table can include determining that the first user is the previous owner of the fine-grained privacy-preserving column. The DBMS 108 can revert ownership of the fine-grained privacy-preserving column back to the first user based on (e.g., in response to) determining that the first user is the previous owner of the fine-grained privacy-preserving column. If the DBMS 108 reverts ownership of the fine-grained privacy-preserving column back to the first user, the second user is no longer the owner of the fine-grained privacy-preserving column. The DBMS 108 can delete the first row from the catalog table based on (e.g., in response to) determining that the ownership of the fine-grained privacy-preserving column is reverted back to the first user.

In other embodiments, ownership of the fine-grained privacy-preserving can be transferred from the second user to a third user. The third user can be associated with a third end user device 104*c* among the plurality of end user devices 104*a-n*. The ownership of the fine-grained privacy-preserving column can be transferred from the second user to the third user in response to receiving an instruction from the second user (e.g., from the second end user device 104*b*). If the ownership of the fine-grained privacy-preserving column is transferred from the second user to the third user, the third user is the only user that has permission to execute DCL operations associated with the fine-grained privacy-preserving column. The second user can be automatically downgraded to a viewer of the fine-grained privacy-preserving column in response to detecting the transfer of the ownership of the fine-grained privacy-preserving column from the second user to the third user. For example, the second user is no longer able to execute DCL operations associated with the fine-grained privacy-preserving column, but the second user may still be able to view the secret information stored in the fine-grained privacy-preserving column.

The DBMS 108 can update the catalog table. The DBMS 108 can update the catalog table in response to detecting a transfer of the ownership of the fine-grained privacy-preserving column from the second user to the third user. For example, the DBMS 108 can update the catalog table by inserting a second row into the catalog table. The second row can be inserted under the first row. The second row of the catalog table can record information indicating that the second user is the previous owner of the fine-grained privacy-preserving column. The second row may only indicate the previous owner of the fine-grained privacy-preserving column (e.g., the second user), but not the current owner (e.g., the third user) of the fine-grained privacy-preserving column. Identification information of the fine-grained privacy-preserving column can be stored in the first column of the second row. Identification information of the second user can be stored in the second column of the second row.

In embodiments, ownership of the fine-grained privacy-preserving can be revoked from the third user. For example, the second user may have transferred ownership of the fine-grained privacy-preserving column accidentally (e.g., by mistake). If ownership of the fine-grained privacy-preserving is to be revoked from the third user, a highly privileged user (e.g., a database administrator) can send a command to revoke the ownership of the fine-grained privacy-preserving column from the third user in accordance with the second user's instruction.

If the DBMS 108 receives a command to revoke the ownership of the fine-grained privacy-preserving column from the third user, the DBMS 108 can determine a previous owner of the fine-grained privacy-preserving column. The DBMS 108 can determine a previous owner of the fine-grained privacy-preserving column using the catalog table, such as by using the information recorded in the second row of the catalog table.

For example, determining the previous owner of the fine-grained privacy-preserving column using the catalog table can include determining that the second user is the previous owner of the fine-grained privacy-preserving column. The DBMS 108 can revert ownership of the fine-grained privacy-preserving column back to the second user based on (e.g., in response to) determining that the second user is the previous owner of the fine-grained privacy-preserving column. If the DBMS 108 reverts ownership of the fine-grained privacy-preserving column back to the second user, the third user is no longer the owner of the fine-grained privacy-preserving column. The DBMS 108 can delete the second row from the catalog table based on (e.g., in response to) determining that the ownership of the fine-grained privacy-preserving column is reverted back to the second user.

Figure 2:
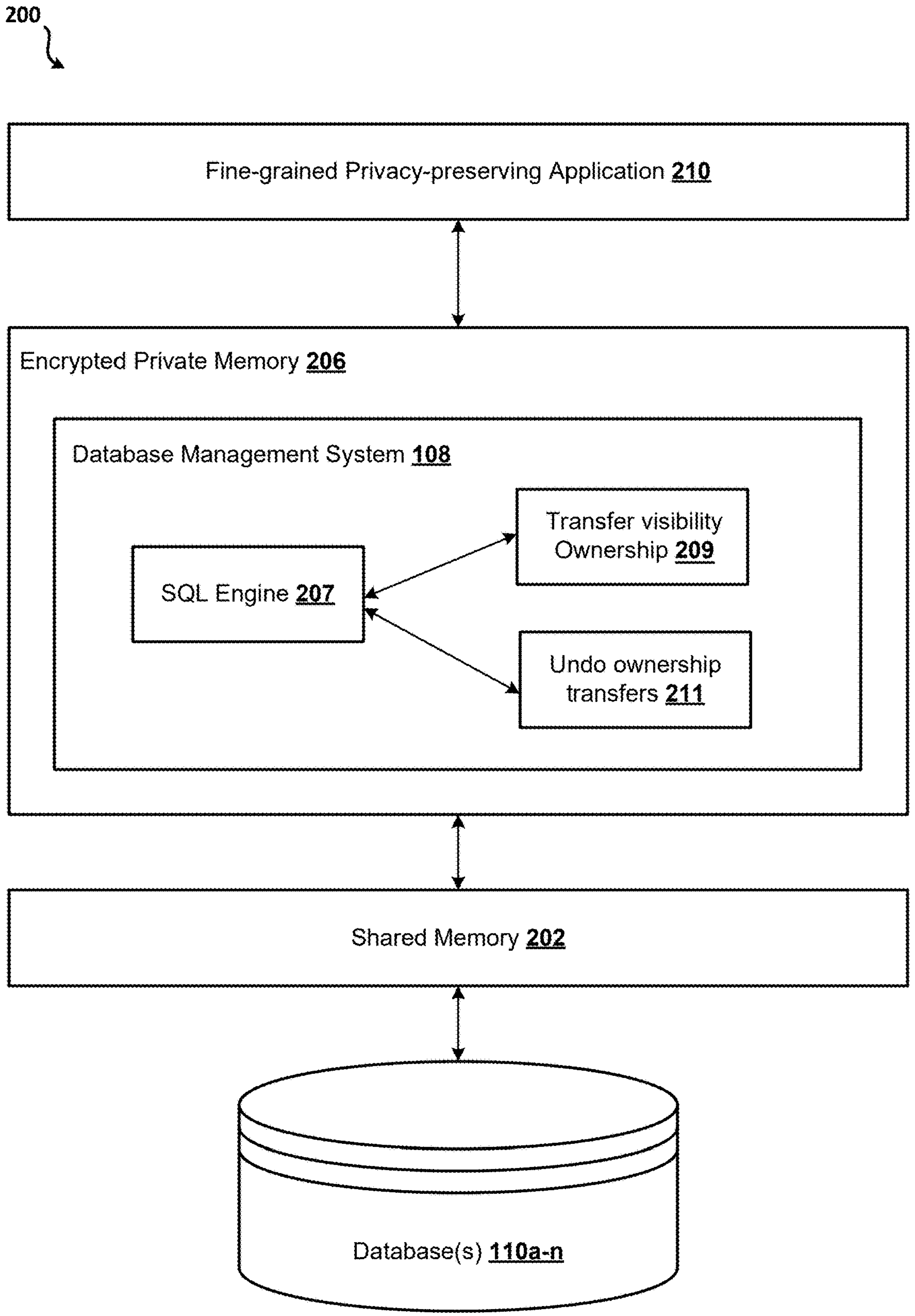
FIG. 2 shows an example system for managing ownership of fine-grained privacy-preserving columns in accordance with the present disclosure.

FIG. 2 shows an example system 200 for managing ownership of fine-grained privacy-preserving columns in accordance with the present disclosure. The system 200 includes the DBMS 108 and the at least one database 110. The DBMS 108 can be contained in an encrypted private memory 206. The DBMS 108 can be in communication with the at least one database 110 via shared memory 202.

The DBMS 108 can support fine-grained privacy-preserving application(s) 210. To fulfill flexible data privacy, the fined-grained approach can be utilized to protect privacy at the column level. For example, an employee data table can contain sensitive information such as salary information. The DBMS 108 has to guarantee that no users other than human resource roles, including database administrators, can view the contents. The DBMS 108 can include a SQL engine 207. The SQL engine 207 can receive commands (e.g., SQL commands) from end users (e.g., from end-user devices 104*a-n*). In response to the commands received from the end users, the SQL engine 207 can cause transfers of ownership 209 and undoing of ownership transfers 211.

The DBMS 108 can rely on a trust execution environment (TEE)-based virtual machine (VM) environment. The TEE-based VM environment can provide execution domain isolation by encryption of memory and registers, integrity measurement, and remote attestation to ensure data confidentiality. VM instances do not require additional development of a library operating system (OS) to support application workloads, thereby conserving engineering resources. Moreover, VM instances have the ability to fully utilize all CPU and memory resources available on a physical node. This advantage facilitates the management of large-memory workloads entirely within secure memory, minimizing I/O operations and boosting performance significantly.

Figure 3:
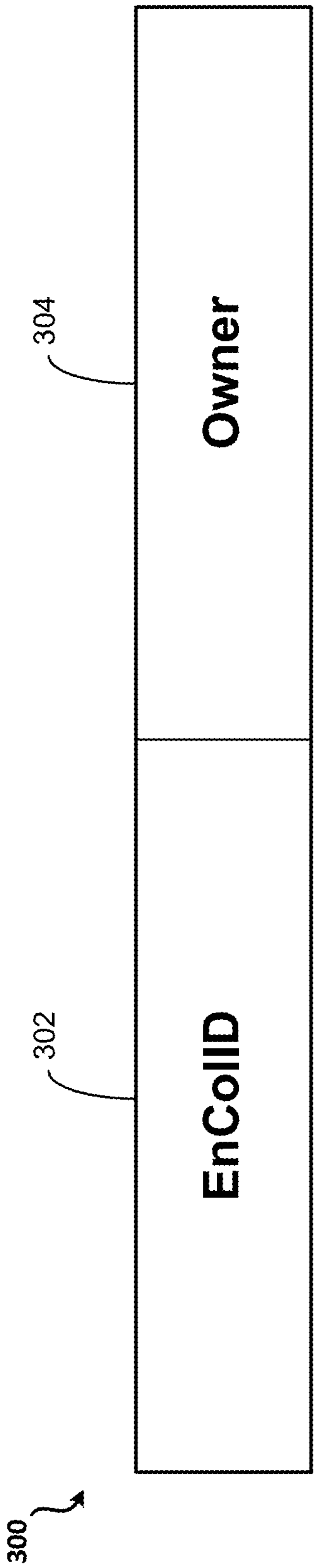
FIG. 3 shows an example catalog table in accordance with the present disclosure.

FIG. 3 shows an example catalog table 300. A DBMS (e.g., the DBMS 108) can create the catalog table 300. The catalog table 300 can be configured to record ownership information of fine-grained privacy-preserving columns that store secret information. For example, the catalog table 300 can be configured to record previous owners of fine-grained privacy-preserving columns. The catalog table 300 can be used (e.g., by the DBMS 108) to revert ownership transfer operations, such as if the ownership of a fine-grained privacy-preserving column is accidentally transferred to a wrong user. The catalog table 300 can include first column 302 and a second column 304. The first column 302 can be configured to record identification information of the fine-grained privacy-preserving columns. The second column 304 can be configured to record information indicative of previous owners of the fine-grained privacy-preserving columns. The catalog table can be automatically updated to record historical ownership transfers associated with the fine-grained privacy-preserving columns.

A first user can be the owner of a fine-grained privacy-preserving column. The first user is able to cause transfer of ownership of the fine-grained privacy-preserving column to a second (e.g., different) user. For example, the first user can cause ownership of the fine-grained privacy-preserving column to be transferred from the first user to the second user. Ownership of the fine-grained privacy-preserving column can be transferred from the first user to the second user. For example, the fine-grained privacy-preserving column can be transferred from the first user to the second user in response to receiving the instruction from the first user.

Figure 4:
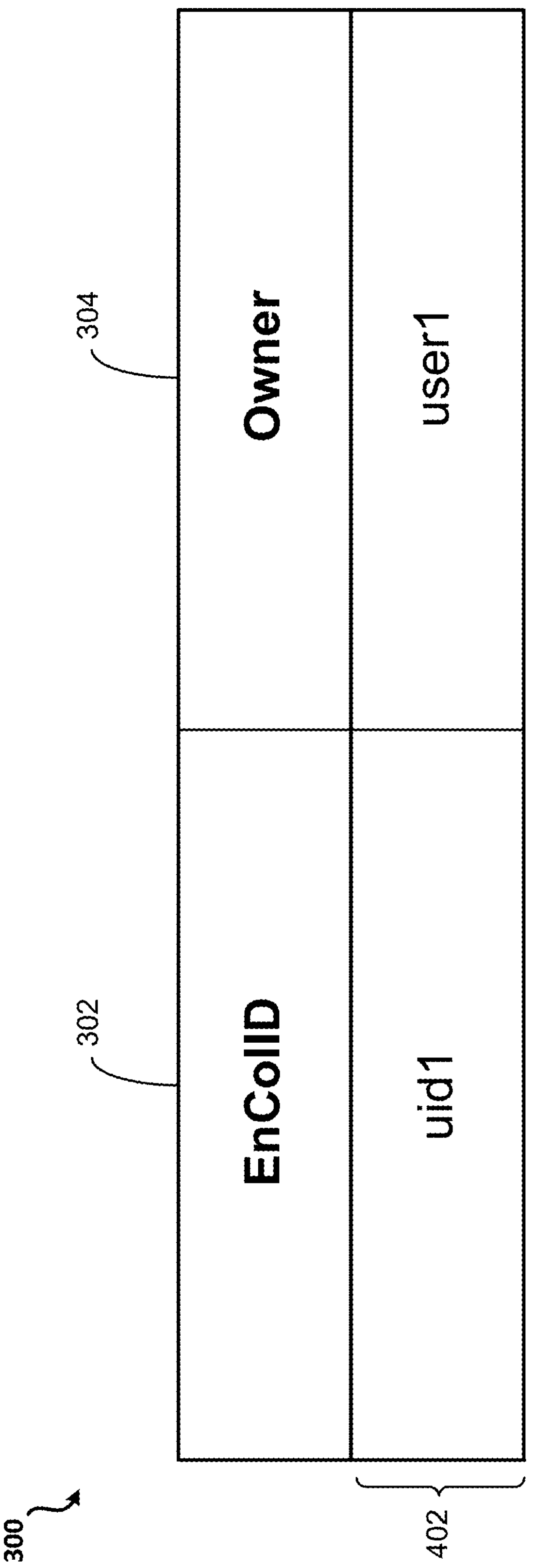
FIG. 4 shows an example updated catalog table in accordance with the present disclosure.

The catalog table 300 can be automatically updated based on (e.g., in response to) detecting a transfer of the ownership of the fine-grained privacy-preserving column from the first user to the second user. FIG. 4 shows the catalog table 300 that has been updated based on (e.g., in response to) detecting a transfer of the ownership of the fine-grained privacy-preserving column from the first user to the second user. Updating the catalog table 300 based on detecting a transfer of the ownership of the fine-grained privacy-preserving column from the first user to the second user can include inserting a first row 402 into the catalog table 300. The first row 402 can record information indicating that the first user is the previous owner of the fine-grained privacy-preserving column. The first row may only indicate the previous owner of the fine-grained privacy-preserving column (e.g., the first user), but not the current owner (e.g., the second user) of the fine-grained privacy-preserving column. Identification information (e.g., uid1) of the fine-grained privacy-preserving column can be stored in the first column 302 of the first row 402. Identification information (e.g., user1) of the first user can be stored in the second column 304 of the first row 402.

In embodiments, ownership of the fine-grained privacy-preserving column can be revoked from the second user. For example, the first user may have transferred ownership of the fine-grained privacy-preserving column accidentally (e.g., by mistake). If ownership of the fine-grained privacy-preserving is to be revoked from the second user, a highly privileged user (e.g., a database administrator) can send a command to revoke the ownership of the fine-grained privacy-preserving column from the second user based on the first user's instruction. If the DBMS receives a command to revoke the ownership of the fine-grained privacy-preserving column from the second user, a previous owner of the fine-grained privacy-preserving column can be determined using the catalog table 300. For example, the previous owner of the fine-grained privacy-preserving column can be determined using the information recorded in the first row 402 of the catalog table 300. Determining the previous owner of the fine-grained privacy-preserving column using the first row 402 of the catalog table 300 can include determining that the first user is the previous owner of the fine-grained privacy-preserving column.

Figure 5:
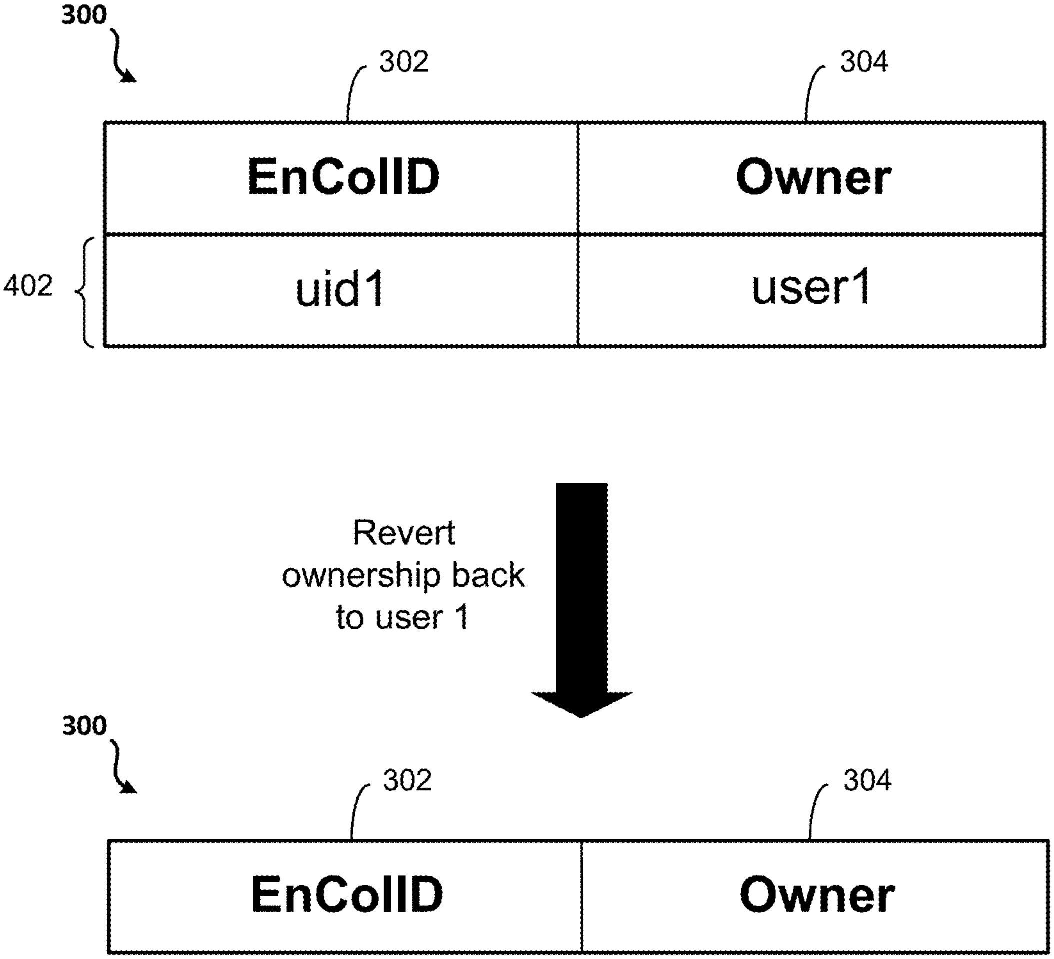
FIG. 5 shows an example updated catalog table in accordance with the present disclosure.

Ownership of the fine-grained privacy-preserving column can be reverted back to the first user based on (e.g., in response to) determining that the first user is the previous owner of the fine-grained privacy-preserving column. The catalog table 300 can be automatically updated based on (e.g., in response to) detecting that ownership of the fine-grained privacy-preserving column has reverted back to the first user. FIG. 5 shows the catalog table 300 that has been updated based on (e.g., in response to) detecting that ownership of the fine-grained privacy-preserving column has reverted back to the first user. Updating the catalog table 300 based on (e.g., in response to) detecting that ownership of the fine-grained privacy-preserving column has reverted back to the first user can include deleting the first row 402 from the catalog table 300.

In other embodiments, ownership of the fine-grained privacy-preserving column can be transferred from the second user to a third user. For example, the second user can cause ownership of the fine-grained privacy-preserving column to be transferred from the second user to the third user. Ownership of the fine-grained privacy-preserving column can be transferred from the second user to the third user. For example, the ownership of the fine-grained privacy-preserving column can be transferred from the second user to the third user in response to receiving the instruction from the second user. The second user can be automatically downgraded to a viewer of the fine-grained privacy-preserving column in response to detecting the transfer of the ownership of the fine-grained privacy-preserving column from the second user to the third user.

Figure 6:
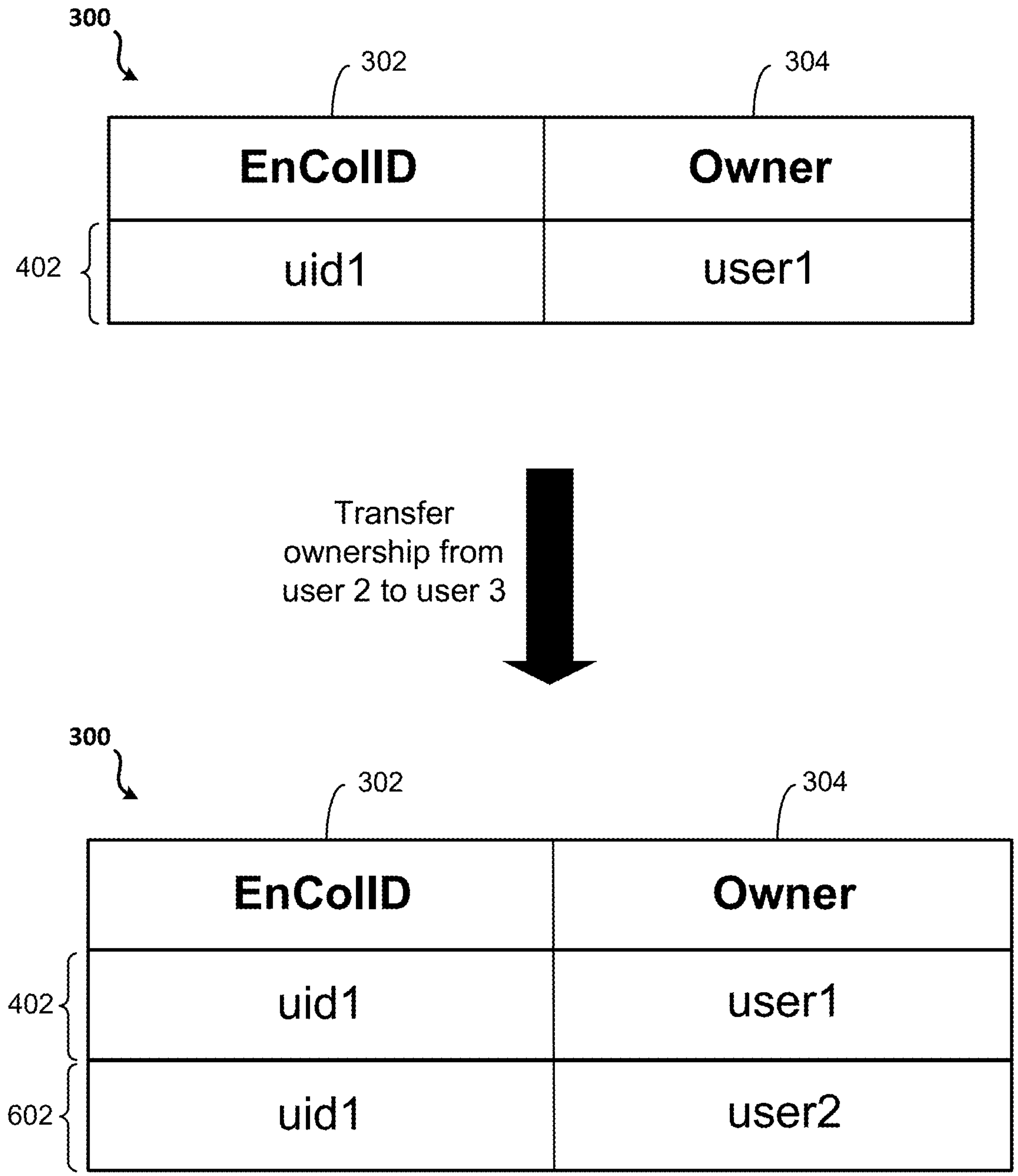
FIG. 6 shows an example updated catalog table in accordance with the present disclosure.

The catalog table 300 can be updated based on (e.g., in response to) detecting the transfer of the ownership of the fine-grained privacy-preserving column from the second user to the third user. FIG. 6 shows the catalog table 300 that has been updated based on (e.g., in response to) detecting the transfer of the ownership of the fine-grained privacy-preserving column from the second user to the third user. Updating the catalog table 300 based on detecting the transfer of the ownership of the fine-grained privacy-preserving column from the second user to the third user can include inserting a second row 602 into the catalog table 300. The second row 602 can record information indicating that the second user is the previous owner of the fine-grained privacy-preserving column. The second row may only indicate the previous owner of the fine-grained privacy-preserving column (e.g., the second user), but not the current owner (e.g., the third user) of the fine-grained privacy-preserving column. Identification information (e.g., uid1) of the fine-grained privacy-preserving column can be stored in the first column 302 of the second row 602. Identification information (e.g., user2) of the second user can be stored in the second column 304 of the second row 602.

In embodiments, ownership of the fine-grained privacy-preserving column can be revoked from the third user. For example, the second user may have transferred ownership of the fine-grained privacy-preserving column to the third user accidentally (e.g., by mistake). If ownership of the fine-grained privacy-preserving is to be revoked from the third user, a highly privileged user (e.g., a database administrator) can send a command to revoke the ownership of the fine-grained privacy-preserving column from the third user. If the DBMS receives a command to revoke the ownership of the fine-grained privacy-preserving column from the third user, a previous owner of the fine-grained privacy-preserving column can be determined using the catalog table 300. For example, the previous owner of the fine-grained privacy-preserving column can be determined using the information recorded in the second row 602 of the catalog table 300. Determining the previous owner of the fine-grained privacy-preserving column using the second row 602 of the catalog table 300 can include determining that the second user is the previous owner of the fine-grained privacy-preserving column.

Figure 7:
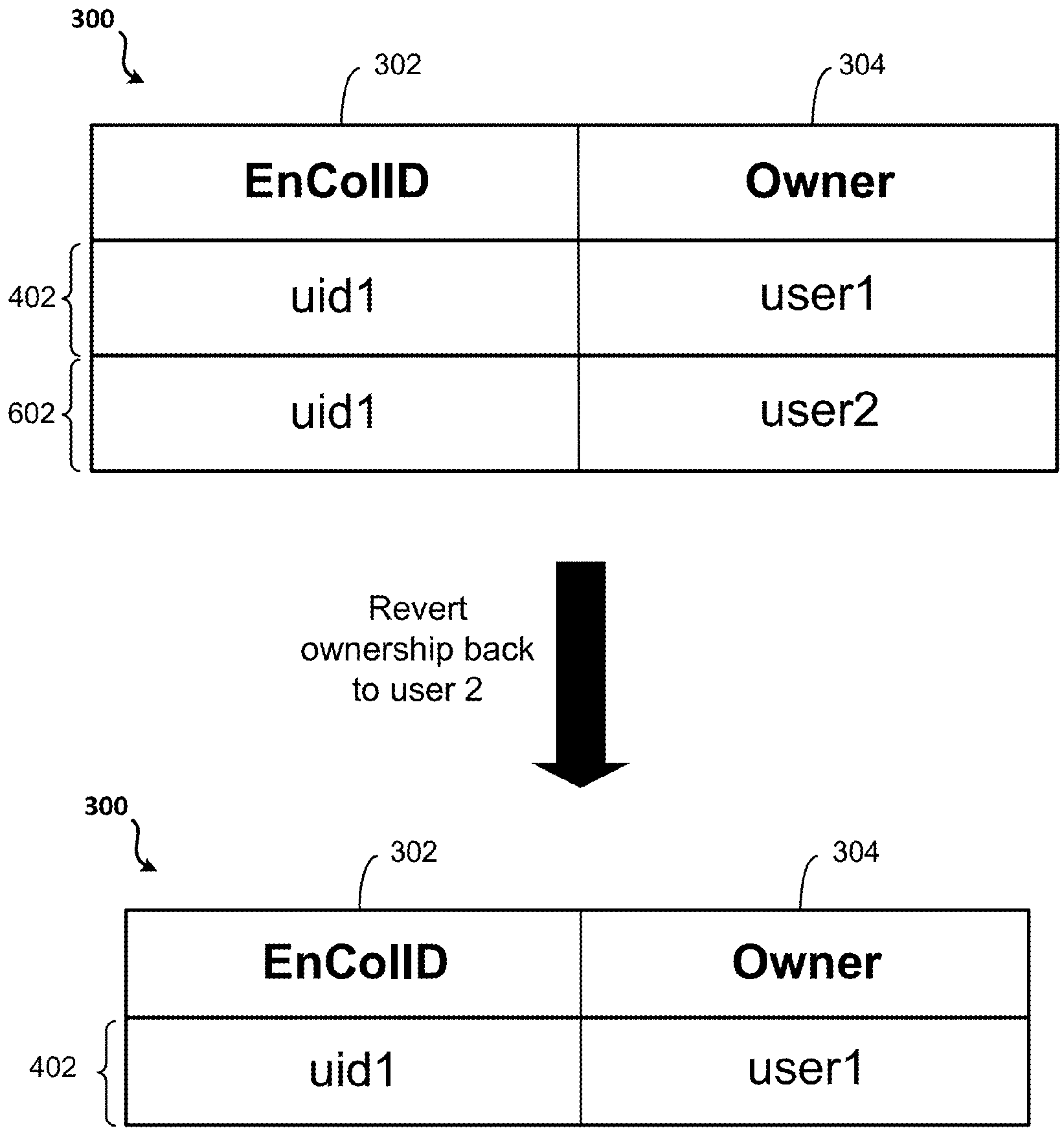
FIG. 7 shows an example updated catalog table in accordance with the present disclosure.

Ownership of the fine-grained privacy-preserving column can be reverted back to the second user based on (e.g., in response to) determining that the second user is the previous owner of the fine-grained privacy-preserving column. The catalog table 300 can be updated based on (e.g., in response to) detecting that ownership of the fine-grained privacy-preserving column has reverted back to the second user. FIG. 7 shows the catalog table 300 that has been updated based on (e.g., in response to) detecting that ownership of the fine-grained privacy-preserving column has reverted back to the second user. Updating the catalog table 300 based on (e.g., in response to) detecting that ownership of the fine-grained privacy-preserving column has reverted back to the second user can include deleting the second row 602 from the catalog table 300.

Figure 8:
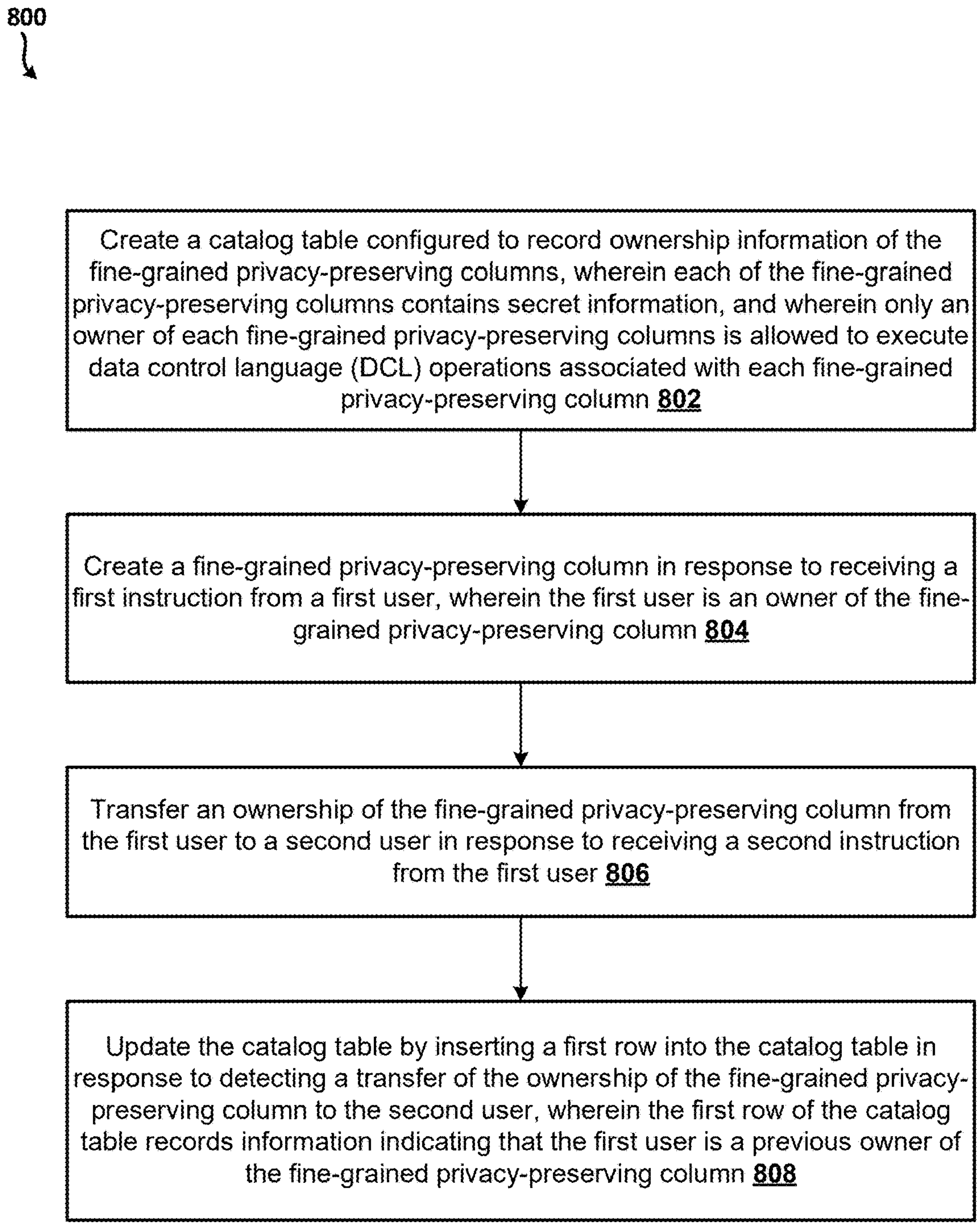
FIG. 8 shows an example process for managing ownership of fine-grained privacy-preserving columns in accordance with the present disclosure.

FIG. 8 illustrates an example process 800 for managing ownership of fine-grained privacy-preserving columns. Although depicted as a sequence of operations in FIG. 8, those of ordinary skill in the art will appreciate that various embodiments may add, remove, reorder, or modify the depicted operations.

At 802, a catalog table (e.g., catalog table 300) can be created. The catalog table can be configured to record ownership information of fine-grained privacy-preserving columns. For example, the catalog table can be configured to record previous owners of fine-grained privacy-preserving columns. The catalog table can be used to revert ownership transfer operations, such as if the ownership of a fine-grained privacy-preserving column is accidentally transferred to a wrong user. The catalog table can include first column and a second column.

The first column (e.g., first column 302) can be configured to record identification information of the fine-grained privacy-preserving columns. The second column (e.g., second column 304) can be configured to record information indicative of previous owners of the fine-grained privacy-preserving columns. Only an owner of each fine-grained privacy-preserving column is allowed to execute data control language (DCL) operations associated with each fine-grained privacy-preserving column.

At 804, a fine-grained privacy-preserving column can be created. The fine-grained privacy-preserving column can be created in response to receiving a first instruction from a first user. The first user can be an owner of the fine-grained privacy-preserving column. If the first user is the owner of the fine-grained privacy-preserving column, the first user is the only user that has permission to execute DCL operations associated with the fine-grained privacy-preserving column.

The first user can transfer ownership of the fine-grained privacy-preserving column to a second (e.g., different) user. At 806, an ownership of the fine-grained privacy-preserving column can be transferred from the first user to the second user. The ownership of the fine-grained privacy-preserving column can be transferred from the first user to the second user in response to receiving a second instruction from the first user. If ownership of the fine-grained privacy-preserving column is transferred from the first user to the second user, the second user is the only user that has permission to execute DCL operations associated with the fine-grained privacy-preserving column.

At 808, the catalog table can be updated. The catalog table can be updated by inserting a first row (e.g., first row 402) into the catalog table. The catalog table can be updated in response to detecting a transfer of the ownership of the fine-grained privacy-preserving column to the second user. The first row of the catalog table can record information indicating that the first user is a previous owner of the fine-grained privacy-preserving column. The first row may only indicate the previous owner of the fine-grained privacy-preserving column (e.g., the first user), but not the current owner (e.g., the second user) of the fine-grained privacy-preserving column. Identification information of the fine-grained privacy-preserving column can be stored in the first column of the first row. Identification information of the first user can be stored in the second column of the first row.

Figure 9:
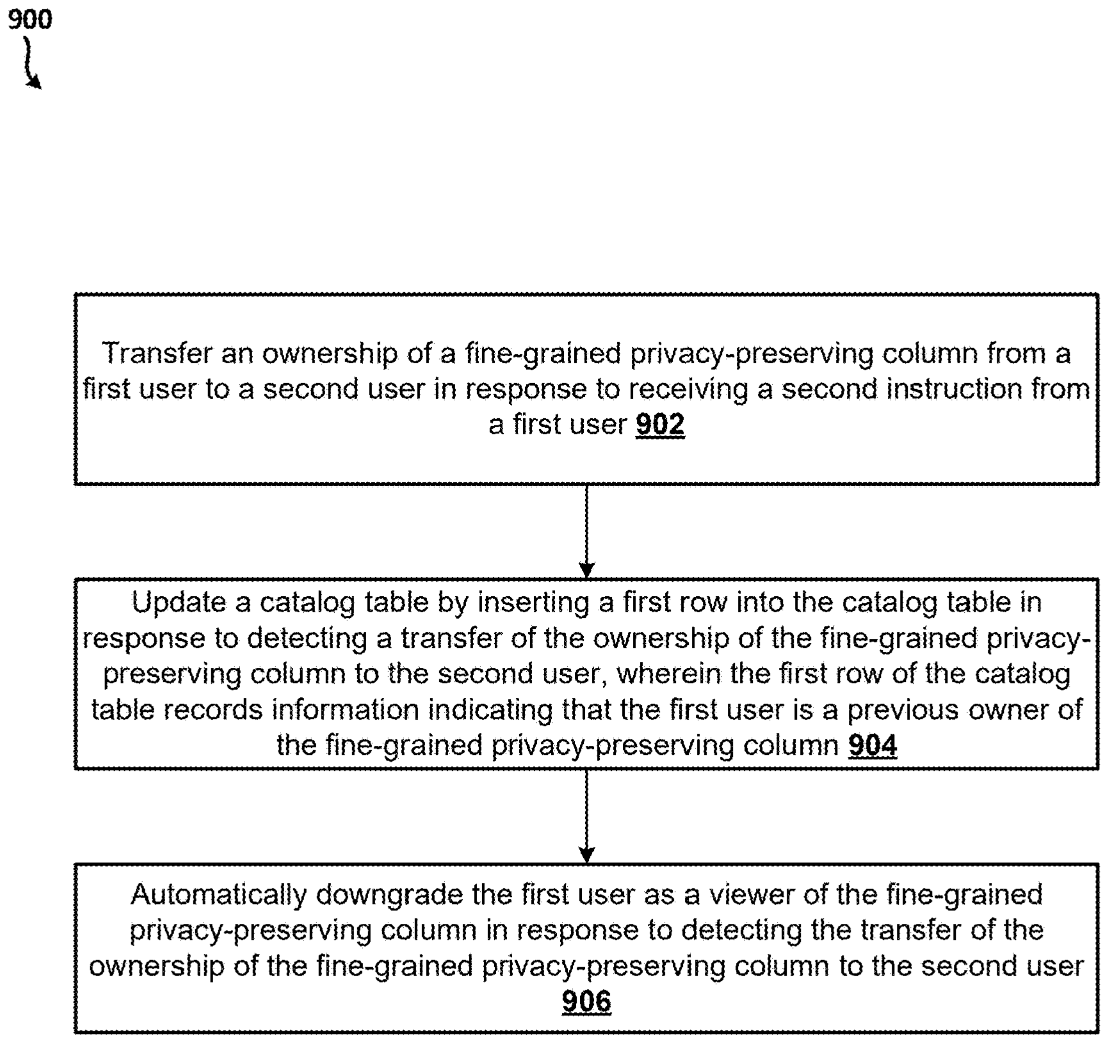
FIG. 9 shows an example process for managing ownership of fine-grained privacy-preserving columns in accordance with the present disclosure.

FIG. 9 illustrates an example process 900 for managing ownership of fine-grained privacy-preserving columns. Although depicted as a sequence of operations in FIG. 9, those of ordinary skill in the art will appreciate that various embodiments may add, remove, reorder, or modify the depicted operations.

A first user can transfer ownership of a fine-grained privacy-preserving column to a second (e.g., different) user. At 902, an ownership of the fine-grained privacy-preserving column can be transferred from the first user to the second user. The ownership of the fine-grained privacy-preserving column can be transferred from the first user to the second user in response to receiving a second instruction from the first user. If ownership of the fine-grained privacy-preserving column is transferred from the first user to the second user, the second user is the only user that has permission to execute DCL operations associated with the fine-grained privacy-preserving column.

At 904, a catalog table (e.g., catalog table 300) can be updated. The catalog table can be updated by inserting a first row (e.g., first row 402) into the catalog table. The catalog table can be updated in response to detecting a transfer of the ownership of the fine-grained privacy-preserving column to the second user. The first row of the catalog table can record information indicating that the first user is a previous owner of the fine-grained privacy-preserving column. The first row may only indicate the previous owner of the fine-grained privacy-preserving column (e.g., the first user), but not the current owner (e.g., the second user) of the fine-grained privacy-preserving column. Identification information of the fine-grained privacy-preserving column can be stored in the first column (e.g., first column 302) of the first row. Identification information of the first user can be stored in the second column (e.g., second column 304) of the first row.

At 906, the first user can be automatically downgraded to a viewer of the fine-grained privacy-preserving column. The first user can be automatically downgraded to a viewer of the fine-grained privacy-preserving column in response to detecting the transfer of the ownership of the fine-grained privacy-preserving column from the first user to the second user. For example, the first user is no longer able to execute DCL operations associated with the fine-grained privacy-preserving column, but the first user may still be able to view the secret information stored in the fine-grained privacy-preserving column.

Figure 10:
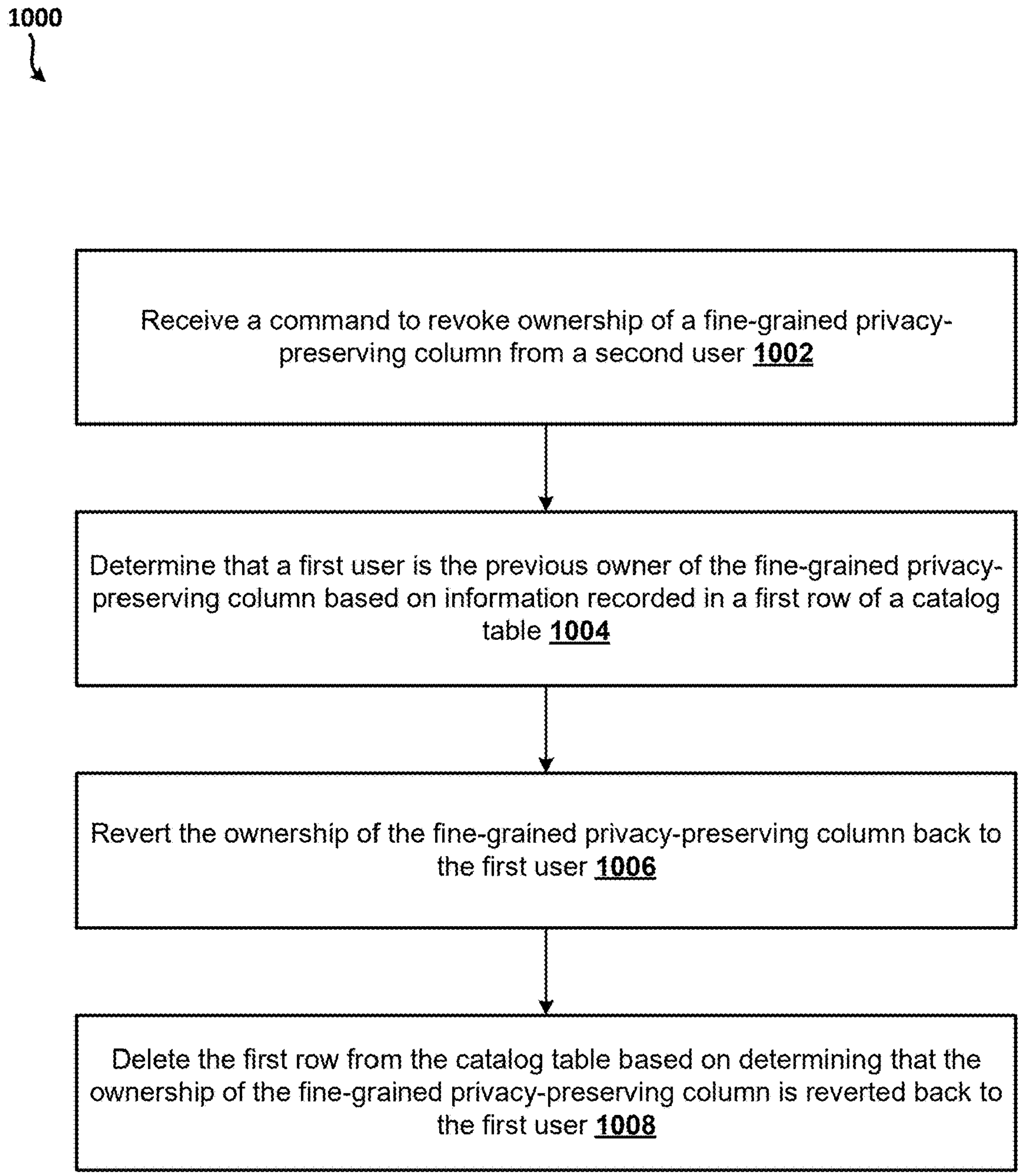
FIG. 10 shows an example process for managing ownership of fine-grained privacy-preserving columns in accordance with the present disclosure.

FIG. 10 illustrates an example process 1000 for managing ownership of fine-grained privacy-preserving columns. Although depicted as a sequence of operations in FIG. 10, those of ordinary skill in the art will appreciate that various embodiments may add, remove, reorder, or modify the depicted operations.

Ownership of a fine-grained privacy-preserving can be revoked from a second user. At 1002, a command can be received. The command can include a command to revoke ownership of a fine-grained privacy-preserving column from the second user. For example, a first user may have transferred ownership of the fine-grained privacy-preserving column to the second user accidentally (e.g., by mistake). If ownership of the fine-grained privacy-preserving is to be revoked from the second user, a highly privileged user (e.g., a database administrator) can send a command to revoke the ownership of the fine-grained privacy-preserving column from the second user based on a first user's instruction.

If a command to revoke the ownership of the fine-grained privacy-preserving column from the second user is received, a previous owner of the fine-grained privacy-preserving column can be determined. At 1004, it can be determined that the first user is the previous owner of the fine-grained privacy-preserving column. It can be determined that the first user is the previous owner of the fine-grained privacy-preserving column based on information recorded in a first row (e.g., first row 402) of a catalog table (e.g., catalog table 300).

At 1006, the ownership of the fine-grained privacy-preserving column can be reverted back to the first user. The ownership of the fine-grained privacy-preserving column can be reverted back to the first user based on (e.g., in response to) determining that the first user is the previous owner of the fine-grained privacy-preserving column. If the ownership of the fine-grained privacy-preserving column is reverted back to the first user, the second user is no longer the owner of the fine-grained privacy-preserving column. At 1008, the first row can be deleted from the catalog table. The first row can be deleted from the catalog table based on determining that the ownership of the fine-grained privacy-preserving column is reverted back to the first user.

Figure 11:
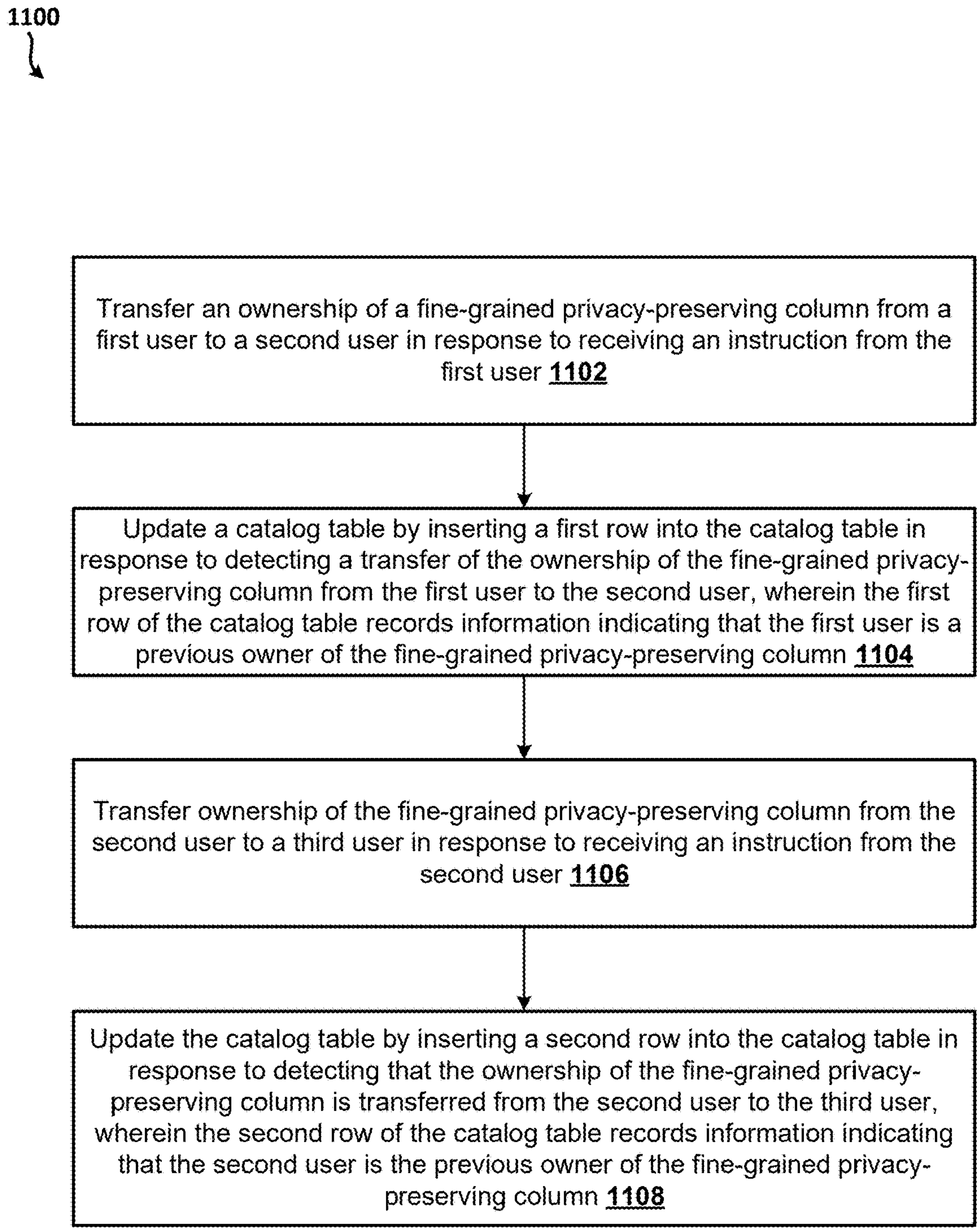
FIG. 11 shows an example process for managing ownership of fine-grained privacy-preserving columns in accordance with the present disclosure.

FIG. 11 illustrates an example process 1100 for managing ownership of fine-grained privacy-preserving columns. Although depicted as a sequence of operations in FIG. 11, those of ordinary skill in the art will appreciate that various embodiments may add, remove, reorder, or modify the depicted operations.

A first user can transfer ownership of a fine-grained privacy-preserving column to a second (e.g., different) user. At 1102, an ownership of the fine-grained privacy-preserving column can be transferred from the first user to the second user. The ownership of the fine-grained privacy-preserving column can be transferred from the first user to the second user in response to receiving a second instruction from the first user. If ownership of the fine-grained privacy-preserving column is transferred from the first user to the second user, the second user is the only user that has permission to execute DCL operations associated with the fine-grained privacy-preserving column.

At 1104, a catalog table (e.g., catalog table 300) can be updated. The catalog table can be updated by inserting a first row (e.g., first row 402) into the catalog table. The catalog table can be updated in response to detecting a transfer of the ownership of the fine-grained privacy-preserving column to the second user. The first row of the catalog table can record information indicating that the first user is a previous owner of the fine-grained privacy-preserving column. The first row may only indicate the previous owner of the fine-grained privacy-preserving column (e.g., the first user), but not the current owner (e.g., the second user) of the fine-grained privacy-preserving column. Identification information of the fine-grained privacy-preserving column can be stored in the first column (e.g., first column 302) of the first row. Identification information of the first user can be stored in the second column (e.g., second column 304) of the first row.

The second user can transfer ownership of a fine-grained privacy-preserving column to a third (e.g., different) user. At 1106, an ownership of the fine-grained privacy-preserving column can be transferred from the second user to the third user. The ownership of the fine-grained privacy-preserving column can be transferred from the second user to the third user in response to receiving an instruction from the second user. If ownership of the fine-grained privacy-preserving column is transferred from the second user to the third user, the third user is the only user that has permission to execute DCL operations associated with the fine-grained privacy-preserving column.

At 1108, the catalog table can be updated. The catalog table can be updated by inserting a second row (e.g., second row 602) into the catalog table. The catalog table can be updated in response to detecting a transfer of the ownership of the fine-grained privacy-preserving column to the third user. The second row of the catalog table can record information indicating that the second user is a previous owner of the fine-grained privacy-preserving column. The second row may only indicate the previous owner of the fine-grained privacy-preserving column (e.g., the second user), but not the current owner (e.g., the third user) of the fine-grained privacy-preserving column. Identification information of the fine-grained privacy-preserving column can be stored in the first column of the second row. Identification information of the first user can be stored in the second column of the second row.

Figure 12:
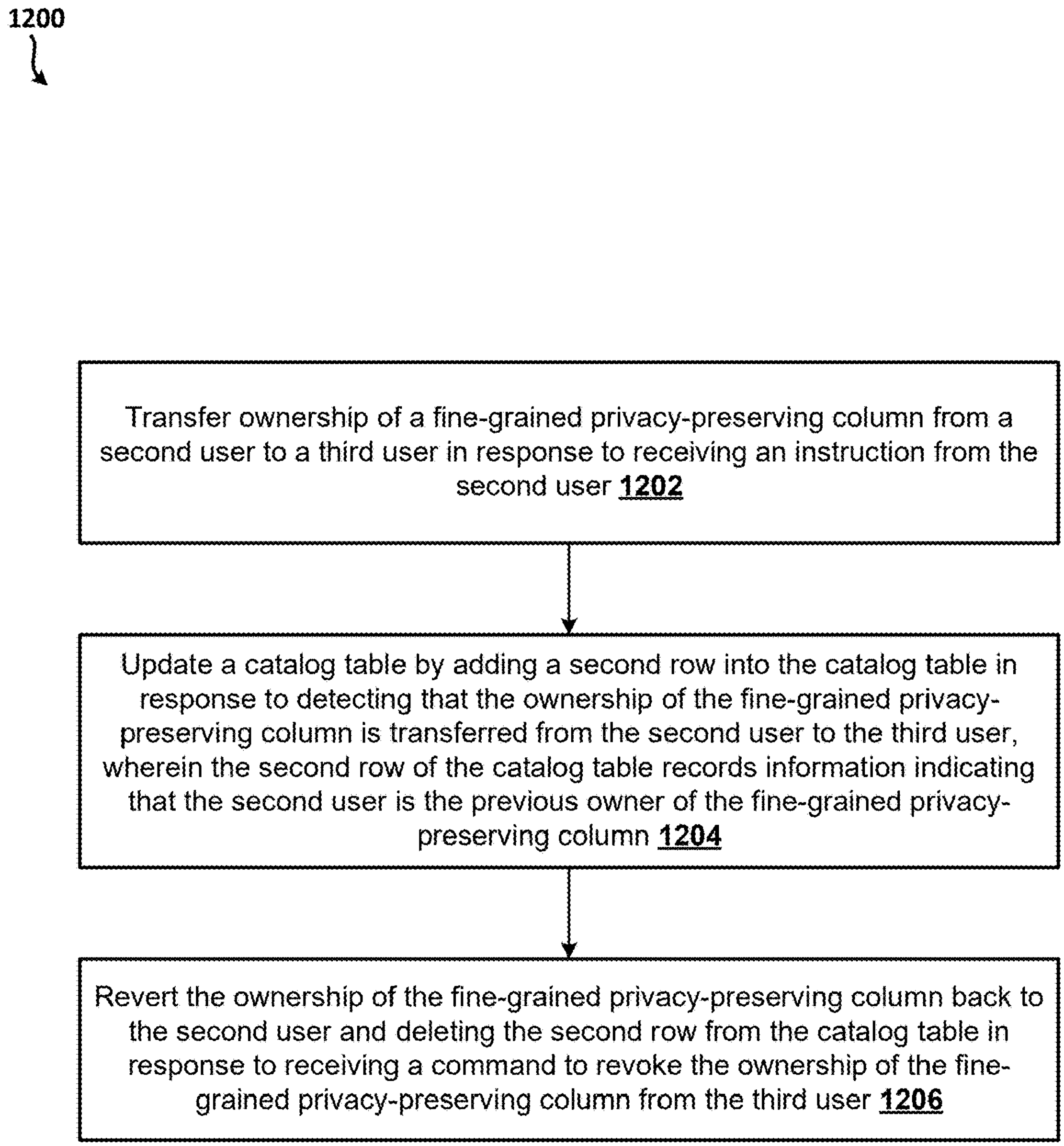
FIG. 12 shows an example process for managing ownership of fine-grained privacy-preserving columns in accordance with the present disclosure.

FIG. 12 illustrates an example process 1200 for managing ownership of fine-grained privacy-preserving columns. Although depicted as a sequence of operations in FIG. 12, those of ordinary skill in the art will appreciate that various embodiments may add, remove, reorder, or modify the depicted operations.

A second user can transfer ownership of a fine-grained privacy-preserving column to a third (e.g., different) user. At 1202, an ownership of the fine-grained privacy-preserving column can be transferred from the second user to the third user. The ownership of the fine-grained privacy-preserving column can be transferred from the second user to the third user in response to receiving an instruction from the second user. If ownership of the fine-grained privacy-preserving column is transferred from the second user to the third user, the third user is the only user that has permission to execute DCL operations associated with the fine-grained privacy-preserving column.

At 1204, a catalog table (e.g., catalog table 300) can be updated. The catalog table can be updated by inserting a second row (e.g., second row 602) into the catalog table. The catalog table can be updated in response to detecting a transfer of the ownership of the fine-grained privacy-preserving column to the third user. The second row of the catalog table can record information indicating that the second user is a previous owner of the fine-grained privacy-preserving column. The second row may only indicate the previous owner of the fine-grained privacy-preserving column (e.g., the second user), but not the current owner (e.g., the third user) of the fine-grained privacy-preserving column. Identification information of the fine-grained privacy-preserving column can be stored in the first column (e.g., first column 302) of the second row. Identification information of the second user can be stored in the second column (e.g., second column 304) of the second row.

At 1206, ownership of the fine-grained privacy-preserving column can be reverted back to the second user. The ownership of the fine-grained privacy-preserving column can be reverted back to the second user in response to receiving a command to revoke the ownership of the fine-grained privacy-preserving column from the third user. The second row can be deleted from the catalog table. The second row can be deleted from the catalog table in response to receiving the command to revoke the ownership of the fine-grained privacy-preserving column from the third user.

Figure 13:
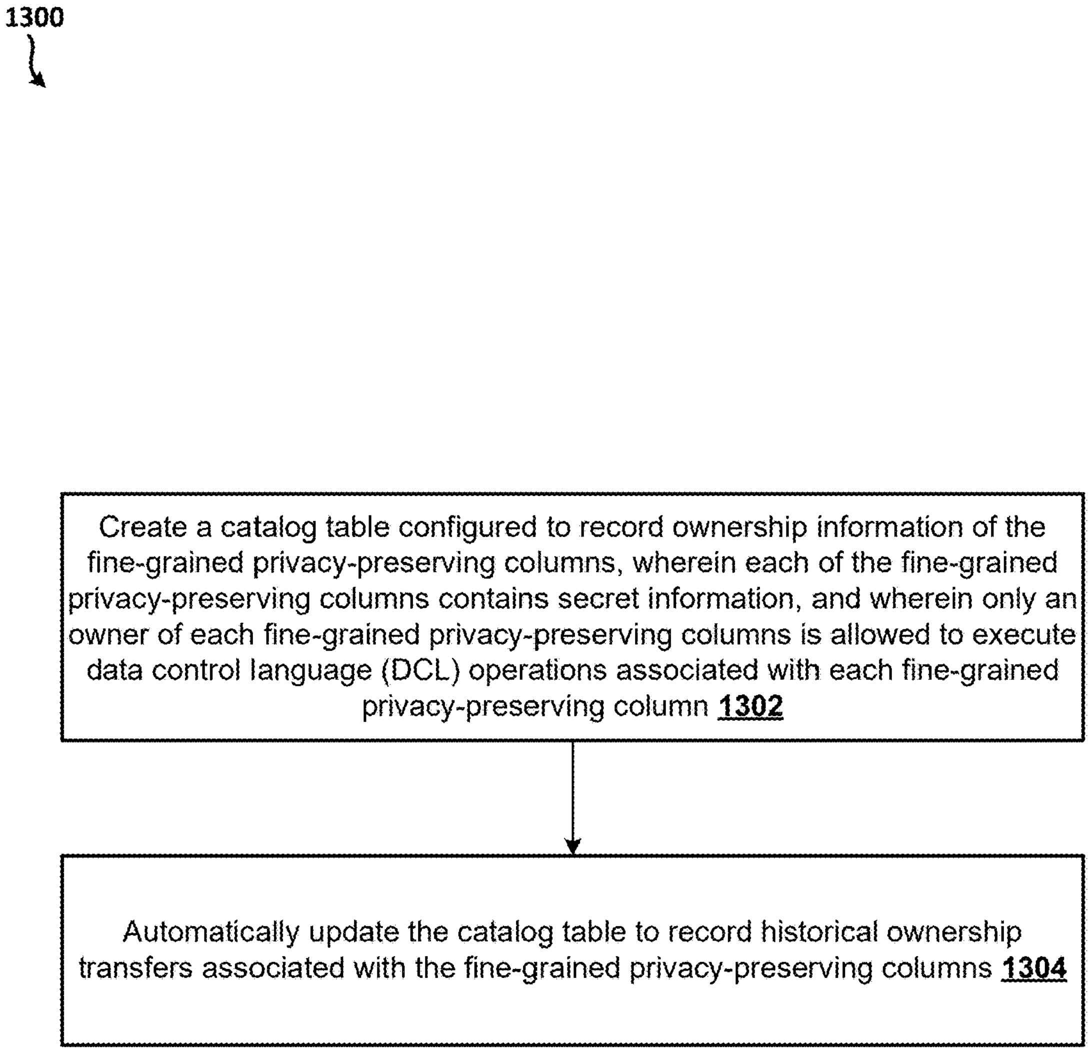
FIG. 13 shows an example process for managing ownership of fine-grained privacy-preserving columns in accordance with the present disclosure.

FIG. 13 illustrates an example process 1300 for managing ownership of fine-grained privacy-preserving columns. Although depicted as a sequence of operations in FIG. 13, those of ordinary skill in the art will appreciate that various embodiments may add, remove, reorder, or modify the depicted operations.

At 1302, a catalog table (e.g., catalog table 300) can be created. The catalog table can be configured to record ownership information of fine-grained privacy-preserving columns. For example, the catalog table can be configured to record previous owners of fine-grained privacy-preserving columns. The catalog table can be used to revert ownership transfer operations, such as if the ownership of a fine-grained privacy-preserving column is accidentally transferred to a wrong user.

The catalog table can include first column and a second column. The first column can be configured to record identification information of the fine-grained privacy-preserving columns. The second column can be configured to record information indicative of previous owners of the fine-grained privacy-preserving columns. Only an owner of each fine-grained privacy-preserving column is allowed to execute data control language (DCL) operations associated with each fine-grained privacy-preserving column. At 1304, the catalog table can be automatically updated to record historical ownership transfers associated with the fine-grained privacy-preserving columns.

For example, each time ownership of a fine-grained privacy-preserving column is transferred to a new owner, a new row can be automatically added to the catalog table. The new row can indicate a previous owner immediately before the new owner. The information recorded in the new row enables to undo the transfer to the new owner (e.g., if the ownership of the fine-grained privacy-preserving column was accidentally or mistakenly transferred to the new user). The ownership of the fine-grained privacy-preserving column can be reverted back to the previous owner based on the information recorded in the catalog table. Further, each time ownership of a fine-grained privacy-preserving column is revoked from a current owner, the most recently added row can be deleted from the catalog table. In this manner, the catalog table can record a chain of historical ownership associated with the fine grained privacy-preserving column.

Figure 14:
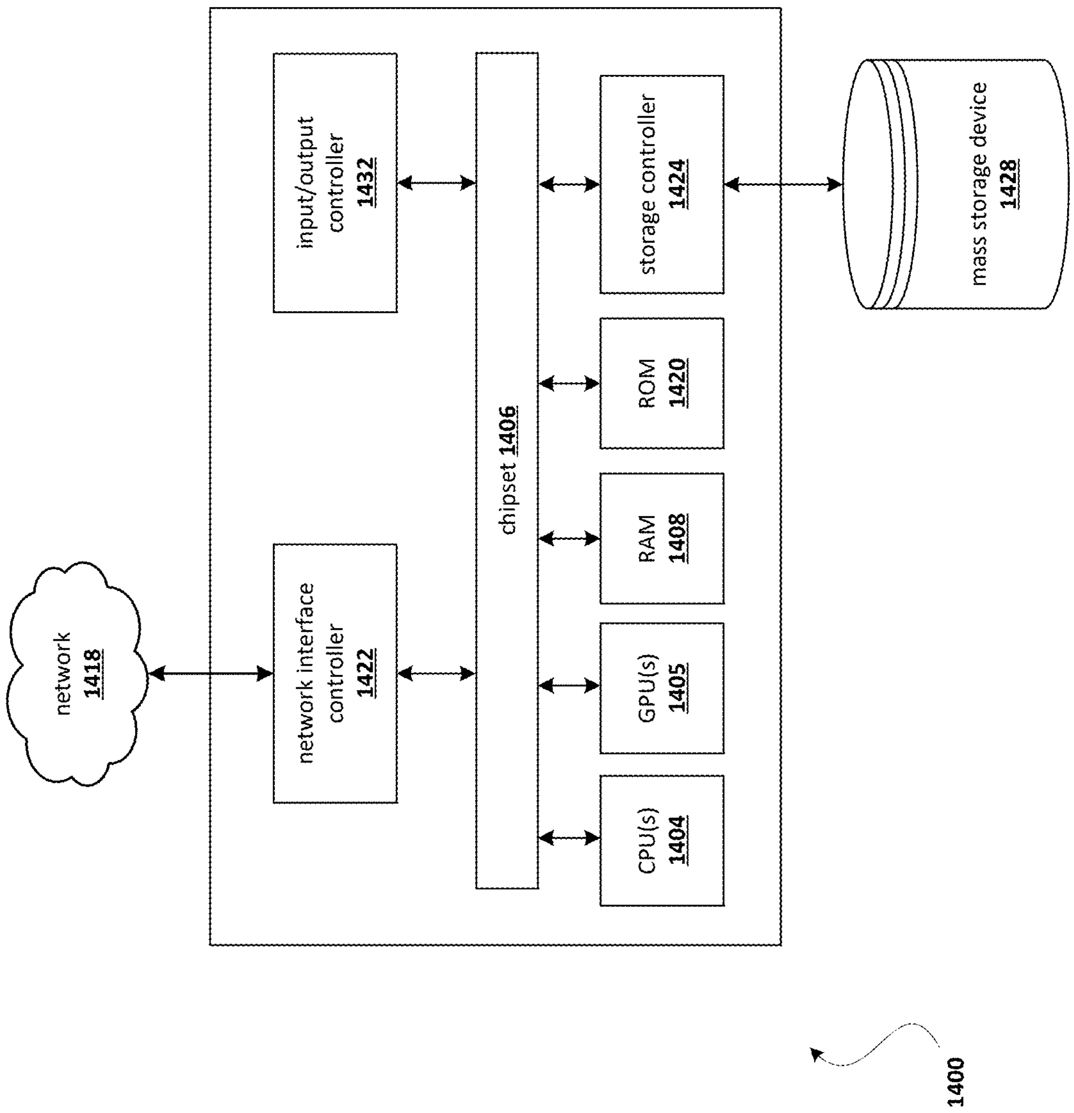
FIG. 14 shows an example computing device which may be used to perform any of the techniques disclosed herein.

FIG. 14 illustrates a computing device that may be used in various aspects, such as the model(s), components, and/or devices depicted in FIGS. 1 and 2. With regard to FIGS. 1 and 2, any or all of the components may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component 1410. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("ID-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A computer-implemented method of managing ownerships of fine-grained privacy-preserving columns, comprising:

creating, by a computing device, a catalog table configured to record ownership information of the fine-grained privacy-preserving columns, wherein each of the fine-grained privacy-preserving columns contains secret information, wherein only an owner of each fine-grained privacy-preserving columns is allowed to execute data control language (DCL) operations associated with each fine-grained privacy-preserving column, and wherein the owner of each of the fine-grained privacy-preserving columns is different from a database administrator associated with the catalog table;

creating, by the computing device, a fine-grained privacy-preserving column in response to receiving a first instruction from a first user, wherein the first user is an owner of the fine-grained privacy-preserving column;

transferring, by the computing device, an ownership of the fine-grained privacy-preserving column from the first user to a second user in response to receiving a second instruction from the first user;

updating, by the computing device, the catalog table by inserting a first row into the catalog table in response to detecting a transfer of the ownership of the fine-grained privacy-preserving column to the second user, wherein the first row of the catalog table records information indicating that the first user is a previous owner of the fine-grained privacy-preserving column;

wherein the computer-implemented method further comprises:

receiving a command to revoke the ownership of the fine-grained privacy-preserving column from the second user;

reverting the ownership of the fine-grained privacy-preserving column back to the first user; and deleting the first row from the catalog table based on determining that the ownership of the fine-grained privacy-preserving column is reverted back to the first user.

2. The computer-implemented method of claim 1, further comprising:

automatically downgrading the first user as a viewer of the fine-grained privacy-preserving column in response to detecting the transfer of the ownership of the fine-grained privacy-preserving column to the second user.

3. The computer-implemented method of claim 1, further comprising:

determining that the first user is the previous owner of the fine-grained privacy-preserving column based on the information recorded in the first row of the catalog table.

4. The computer-implemented method of claim 1, further comprising:

transferring the ownership of the fine-grained privacy-preserving column from the second user to a third user in response to receiving an instruction from the second user; and updating the catalog table by adding a second row into the catalog table in response to detecting that the ownership of the fine-grained privacy-preserving column is transferred from the second user to the third user, wherein the second row of the catalog table records information indicating that the second user is a previous owner of the fine-grained privacy-preserving column.

5. The computer-implemented method of claim 1, further comprising:

automatically updating the catalog table to record historical ownership transfers associated with the fine-grained privacy-preserving columns.

6. The computer-implemented method of claim 1, wherein the catalog table comprises a first column and a second column, the first column configured to record identification information of the fine-grained privacy-preserving columns, and the second column configured to record information indicative of previous owners of the fine-grained privacy-preserving columns.

7. The computer-implemented method of claim 4, further comprising:

reverting the ownership of the fine-grained privacy-preserving column back to the second user and deleting the second row from the catalog table in response to receiving a command to revoke the ownership of the fine-grained privacy-preserving column from the third user.

8. A computing system of managing ownerships of fine-grained privacy-preserving columns, comprising:

at least one processor; and at least one memory communicatively coupled to the at least one processor and comprising computer-readable instructions that upon execution by the at least one processor cause the at least one processor to perform operations comprising:

creating a catalog table configured to record ownership information of the fine-grained privacy-preserving columns, wherein each of the fine-grained privacy-preserving columns contains secret information, and wherein only an owner of each fine-grained privacy-preserving columns is allowed to execute data control language (DCL) operations associated with each fine-grained privacy-preserving column, wherein the owner of each of the fine-grained privacy-preserving columns is different from a database administrator associated with the catalog table;

creating a fine-grained privacy-preserving column in response to receiving a first instruction from a first user, wherein the first user is an owner of the fine-grained privacy-preserving column;

transferring an ownership of the fine-grained privacy-preserving column from the first user to a second user in response to receiving a second instruction from the first user;

updating the catalog table by inserting a first row into the catalog table in response to detecting a transfer of the ownership of the fine-grained privacy-preserving column to the second user, wherein the first row of the catalog table records information indicating that the first user is a previous owner of the fine-grained privacy-preserving column, wherein the operations further comprise:

receiving a command to revoke the ownership of the fine-grained privacy-preserving column from the second user;

reverting the ownership of the fine-grained privacy-preserving column back to the first user; and deleting the first row from the catalog table based on determining that the ownership of the fine-grained privacy-preserving column is reverted back to the first user.

9. The computing system of claim 8, the operations further comprising:

automatically downgrading the first user as a viewer of the fine-grained privacy-preserving column in response to detecting the transfer of the ownership of the fine-grained privacy-preserving column to the second user.

10. The computing system of claim 8, the operations further comprising:

determining that the first user is the previous owner of the fine-grained privacy-preserving column based on the information recorded in the first row of the catalog table.

11. The computing system of claim 8, the operations further comprising:

transferring the ownership of the fine-grained privacy-preserving column from the second user to a third user in response to receiving an instruction from the second user; and updating the catalog table by adding a second row into the catalog table in response to detecting that the ownership of the fine-grained privacy-preserving column is transferred from the second user to the third user, wherein the second row of the catalog table records information indicating that the second user is a previous owner of the fine-grained privacy-preserving column.

12. The computing system of claim 11, the operations further comprising:

reverting the ownership of the fine-grained privacy-preserving column back to the second user and deleting the second row from the catalog table in response to receiving a command to revoke the ownership of the fine-grained privacy-preserving column from the third user.

13. A non-transitory computer-readable storage medium, storing computer-readable instructions that upon execution by a processor cause the processor to implement operations comprising:

creating a catalog table configured to record ownership information of the fine-grained privacy-preserving columns, wherein each of the fine-grained privacy-preserving columns contains secret information, and wherein only an owner of each fine-grained privacy-preserving columns is allowed to execute data control language (DCL) operations associated with each fine-grained privacy-preserving column, wherein the owner of each of the fine-grained privacy-preserving columns is different from a database administrator associated with the catalog table;

creating a fine-grained privacy-preserving column in response to receiving a first instruction from a first user, wherein the first user is an owner of the fine-grained privacy-preserving column;

transferring an ownership of the fine-grained privacy-preserving column from the first user to a second user in response to receiving a second instruction from the first user;

updating the catalog table by inserting a first row into the catalog table in response to detecting a transfer of the ownership of the fine-grained privacy-preserving column to the second user, wherein the first row of the catalog table records information indicating that the first user is a previous owner of the fine-grained privacy-preserving column;

wherein the operations further comprise:

receiving a command to revoke the ownership of the fine-grained privacy-preserving column from the second user;

reverting the ownership of the fine-grained privacy-preserving column back to the first user; and deleting the first row from the catalog table based on determining that the ownership of the fine-grained privacy-preserving column is reverted back to the first user.

14. The non-transitory computer-readable storage medium of claim 13, the operations further comprising:

automatically downgrading the first user as a viewer of the fine-grained privacy-preserving column in response to detecting the transfer of the ownership of the fine-grained privacy-preserving column to the second user.

15. The non-transitory computer-readable storage medium of claim 13, the operations further comprising:

determining that the first user is the previous owner of the fine-grained privacy-preserving column based on the information recorded in the first row of the catalog table.

16. The non-transitory computer-readable storage medium of claim 13, the operations further comprising:

transferring the ownership of the fine-grained privacy-preserving column from the second user to a third user in response to receiving an instruction from the second user; and updating the catalog table by adding a second row into the catalog table in response to detecting that the ownership of the fine-grained privacy-preserving column is transferred from the second user to the third user, wherein the second row of the catalog table records information indicating that the second user is a previous owner of the fine-grained privacy-preserving column.

17. The non-transitory computer-readable storage medium of claim 13, the operations further comprising:

automatically updating the catalog table to record historical ownership transfers associated with the fine-grained privacy-preserving columns.

* * * * *